United States Patent Office 2,840,578
Patented June 24, 1958

2,840,578
9α-HYDROXYPROGESTERONE

David Perlman, Princeton, and James D. Dutcher and Josef Fried, New Brunswick, N. J., and Elwood O. Titus, Kensington, Md., assignors to Olin Mathieson Chemical Corporation, New York, N. Y., a corporation of Virginia No Drawing. Application May 24, 1957
Serial No. 661,307

1 Claim. (Cl. 260—397.45)

This application is a continuation-in-part of our parent application Serial No. 283,122, filed April 18, 1952, and now abandoned.

This invention relates to, and has for its object, the provision of 9α-hydroxyprogesterone, a steroid of the structural formula

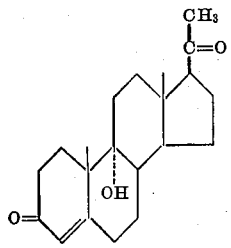

9α-hydroxyprogesterone is a physiologically active steroid which possesses both glucocorticoid and progestational activity. Hence it can be used, for example, in lieu of progesterone in the treatment of functional uterine bleeding, for which purpose it is administered in the same manner as progesterone, with dosage adjusted for the relative activity of the steroid.

9α-hydroxyprogesterone is prepared by subjecting progesterone to the action of enzymes of the microorganism *Streptomyces aureofaciens* under oxidizing conditions. The oxidation can best be effected by either including the steroid in an aerobic culture of the microorganism, or by bringing together in an aqueous medium the steroid, air and enzymes of non-proliferating cells of the microorganism.

In general, the conditions of culturing *Streptomyces aureofaciens* for the purposes of this invention are (except for the inclusion of the steroid to be converted) the same as those of culturing various other Streptomyces for the production of antibiotics and/or vitamin $B_{12}$, i. e., the microorganism is aerobically grown in contact with (in or on) a suitable fermentation medium. A suitable medium essentially comprises a source of carbon and energy. The latter may be a carbohydrate (such as sucrose, molasses, glucose, maltose, starch or dextrin), a fatty acid, a fat (such as soybean oil) and/or the steroid itself. Preferably, however, the medium includes an assimilable source of carbon and energy in addition to the steroid.

The source of nitrogenous factors may be organic (e. g., soybean meal, corn steep liquor, meat extract and/or distillers solubles) or synthetic (i. e., composed of simple, synthesizable organic or inorganic compounds such as ammonium salts, alkali nitrates, amino acids or urea).

An adequate sterile-air supply should be maintained during fermentation, for example, by the conventional methods of exposing a large surface of the medium to air or by utilizing submerged aerated culture. The steroid may be added to the culture during the incubation period or included in the medium prior to sterilization or inoculation. The preferred range of concentration of the steroid in the culture is about 0.01 to 0.10%. The culture period may vary considerably, the range of about 6 to 96 hours being feasible but not limiting.

The process yields, inter alia, 9α-hydroxyprogesterone.

The following example illustrates the process of this invention:

EXAMPLE

(a) Fermentation

An aqueous medium of the following composition is prepared:

| | | |
|---|---|---|
| Glycine | g | 2.6 |
| Sodium acid glutamate | g | 2.2 |
| Soybean oil | g | 2.2 |
| $K_2HPO_4 \cdot 3H_2O$ | g | 0.5 |
| $MgSO_4 \cdot 7H_2O$ | g | 0.5 |
| $FeSO_4 \cdot 7H_2O$ | g | 0.025 |
| $ZnSO_4 \cdot 7H_2O$ | g | 0.03 |
| $Co(NO_3)_2 \cdot 6H_2O$ | g | 0.005 |
| $CuSO_4 \cdot 5H_2O$ | g | 0.016 |
| $MnSO_4 \cdot 4H_2O$ | g | 0.012 |
| $CaCl_2 \cdot 2H_2O$ | g | 0.05 |
| Progesterone | g | 0.2 |
| Water | liter | 1 |

One hundred milliliter portions of the medium are distributed into 280 500-ml. Erlenmeyer flasks, and the flasks are plugged with cotton and sterilized in the usual manner (by autoclaving). When cool, each of the flasks is inoculated with 3 ml. of a vegetative inoculum of *Streptomyces aureofaciens* NRRL 2209 which has been grown for 48 hours on a soybean meal-glucose medium. The flasks are then placed on a reciprocating shaker (120 four-inch cycles per minute), and agitation as well as aeration is allowed to proceed at 24–25° C. for five days. The contents of the flasks are pooled and, after the pH of the whole culture is adjusted to 3–4 with $H_2SO_4$, the solids are removed by centrifugation.

(b) Isolation

The aqueous fraction is then extracted with four 5-liter portions of chloroform. The chloroform is removed by evaporation under vacuum, leaving a residue of the solid oxidation products (usually containing some lipid material and unoxidized steroid from the culture medium as impurities).

This residue of oxidized steroids amounting to about 4.8 grams is dissolved in 200 ml. of 80% aqueous methanol and extracted seven times with equal volumes (200 ml.) of hexane. The methanol solution remaining is concentrated in vacuo to a volume of 50 ml., then extracted three times with 200-ml. portions of chloroform. This chloroform extract is then evaporated to dryness in vacuo and dissolved in 25 ml. of chloroform +25 ml. of benzene. The resulting solution is chromatographed over a 200 g. column of silica gel (Davison No. 923). Eluates of the absorbed materials are obtained as indicated below:

| Eluate | Total vol. (ml.) | Total dry wt. (mg.) | Component |
|---|---|---|---|
| Benzene-chloroform, 1:2 | 5,400 | 1,118 | Progesterone. |
| Chloroform | 14,200 | 1,289 | 6β-Hydroxyprogesterone +9α-hydroxyprogesterone. |
| Acetone-chloroform, 1:1 | 1,650 | 822 | 6β,9α-Dihydroxyprogesterone. |
| Acetone-chloroform, 1:9 | 21,000 | 346 | Amorphous. |

6β-hydroxyprogesterone and 9α-hydroxyprogesterone are separated by rechromatography of the chloroform fraction on sulfuric acid-washed alumina, 6β-hydroxyprogesterone being obtained by elution with ether-benzene, 1:1, and 9α-hydroxyprogesterone by elution with ether-acetone, 9:1.

9α-hydroxyprogesterone melts at about 189–191° C.; $[\alpha]_D^{23} +202°$ (c., 0.66 in chloroform); +150° (c., 0.38 in acetone);

$$\lambda_{max.}^{alc.} \ 242 \ m\mu (\epsilon = 19,000); \lambda_{max.}^{Nujol} \ 3.06 \ \mu (OH)$$

5.90 μ ($C_{20}$ ketone), 6.07 μ ($\Delta^4$-3-ketone). 9α-hydroxyprogesterone is not acetylated by acetic anhydride-pyridine at room temperature and is stable towards chromic acid in acetic acid for 18 hours at room temperature. Dioxime (M. P. about 279–281° C.).

The invention may be otherwise variously embodied within the scope of the appended claim.

What is claimed is:

9α-hydroxyprogesterone.

References Cited in the file of this patent

UNITED STATES PATENTS 2,595,596     Moffet _____ May 6, 1952